United States Patent Office 3,516,136
Patented June 23, 1970

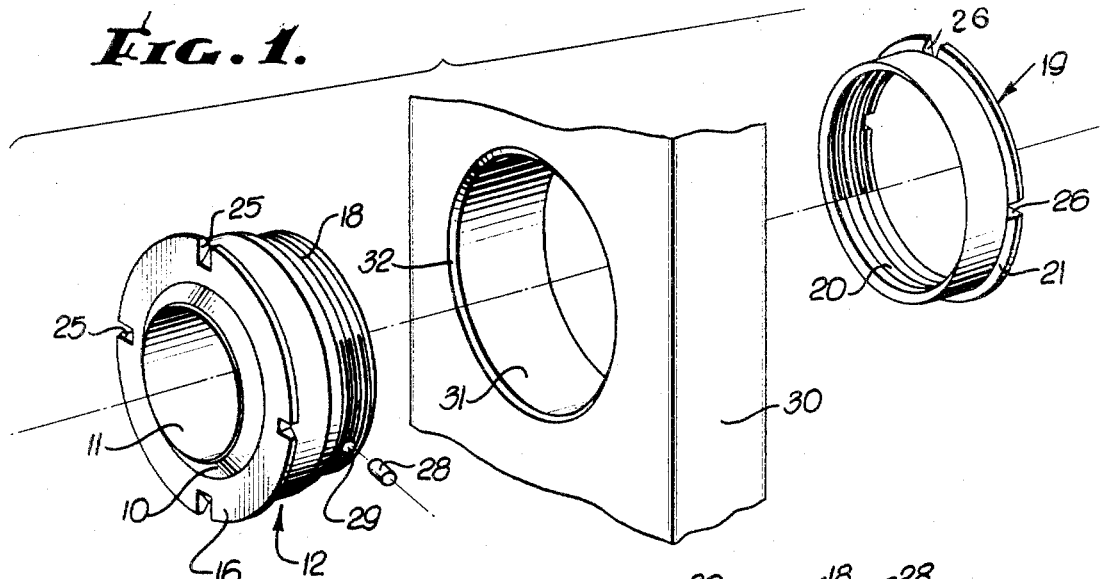
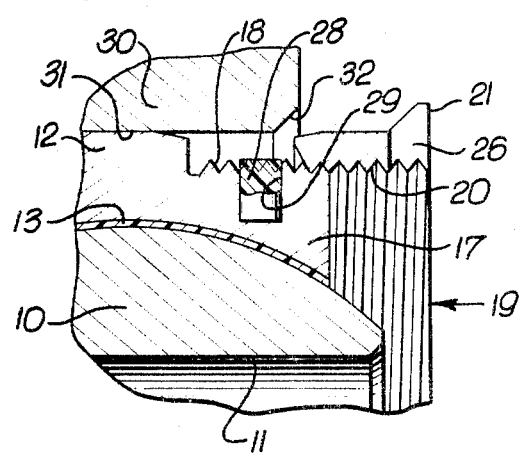
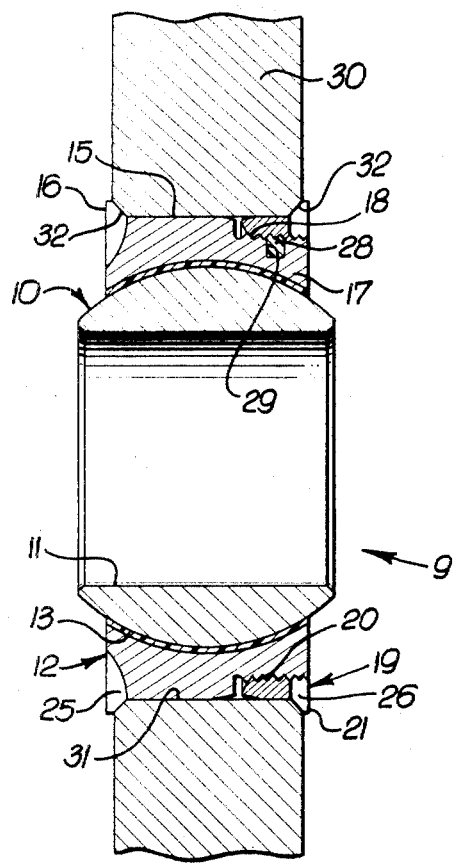
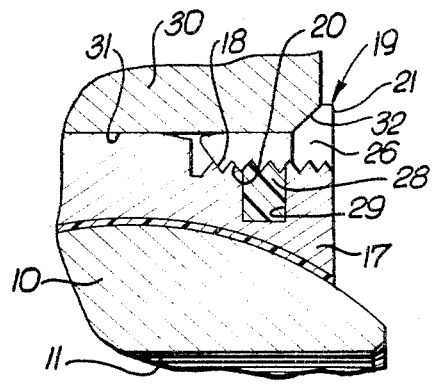
INVENTORS.
EDWIN J. TURNER
WILLARD J. CARTER
By Miketta, Glenny, Poms & Smith
ATTORNEYS.

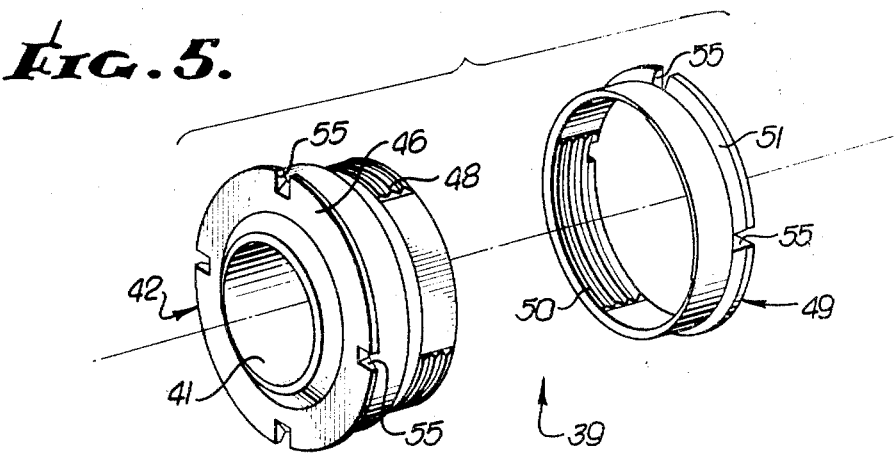
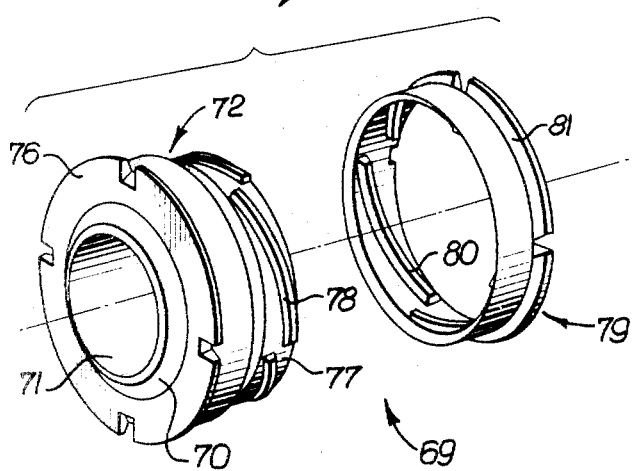
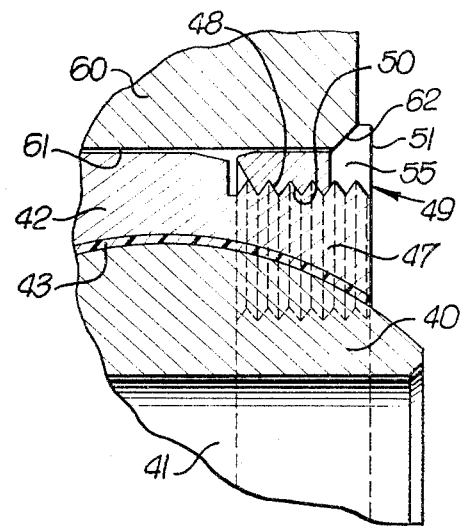
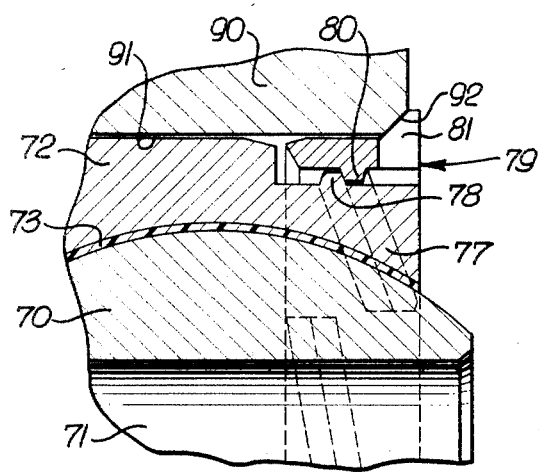

3,516,136
SELF-ALIGNING BEARING AND METHOD OF FORMING AND MOUNTING THEREOF
Willard J. Carter, Decatur, Ga., and Edwin John Turner, Culver City, Calif., assignors to Kahr Bearing Corporation, Burbank, Calif., a corporation of California
Filed June 28, 1968, Ser. No. 741,063
Int. Cl. B23p 11/00; B21d 53/10
U.S. Cl. 29—149.5                           10 Claims

ABSTRACT OF THE DISCLOSURE

A self-aligning bearing and a method of forming and mounting such self-aligning bearing in a housing opening in which a bearing outer race member is formed around a generally spherical inner ball member by forming a flange at one end of the race member, undercutting and externally threading the other end of the race member, forming a locking nut having complementary internal threads and a flange, and positioning the race member and the inner ball member within a housing opening and threadedly engaging the locking nut on the race member so as to secure the self-aligning bearing within the housing opening.

---

Self-aligning or spherical bearings are adapted for a variety of uses and purposes in many industries. One common type of spherical bearing comprises an outer race member and a generally spherical ball member having an axial bore. Such spherical bearings may be used in specialized installations requiring strict specifications such as in scientific equipment or accurate machinery. One such application is in the missile and aircraft industry where the spherical bearing is mounted in the end of a rod, such as the actuating rod of a hydraulic piston assembly, and is commonly referred to as a "rod end bearing."

The exacting requirements for the last-mentioned type of spherical bearings has led to a number of innovations and improvements in the method of manufacturing such spherical bearings. For example, reference may be made to United States Pat. Nos. 2,857,656, 2,995,813, 2,997,775 and 3,063,133. These patents disclose methods of manufacturing self-aligning bearings so as to provide a bearing surface in the outer race and on the spherical ball member which reduce friction, increase surface contact, increase load carrying and wear characteristics, and provide extreme accuracy. Such prior art methods have also given rise to certain economies in manufacture.

While the above-described methods for manufacturing the self-aligning bearings have improved the bearings themselves, the prior art has not successfully solved the problems in mounting such self-aligning bearings. Commonly, such self-aligning bearings are mounted in a bracket, hangar or housing by forming a circumferential staking groove in the housing opening and an annular projection on the bearing which snap fits into the housing. While this mounting method is not unsatisfactory for all installations, it is a permanent type of installation so that the bearing cannot be removed without destroying the bearing and which requires special tools for the removal.

Generally stated, the self-aligning bearing and the method of forming and mounting the self-aligning bearing in a housing having a cylindrical bore of the present invention comprises forming a bearing outer race member around a generally spherical inner ball member, forming a radially outwardly extending flange with a diameter greater than the diameter of the housing opening at one end of the race member, providing locking means for holding the outer race member in the cylindrical bore, positioning the outer race member and the inner ball member within the housing bore so that the race flange bears against the housing and engaging the locking means so as to secure the self-aligning bearing within the housing opening in a manner that prevents loosening and movement of the bearing assembly with respect to the housing.

It is an object of the present invention, therefore, to disclose and provide a novel, rapid and economical method of forming and mounting a self-aligning bearing within a housing cylindrical bore.

A further object of the invention is to disclose and provide a method of making and mounting a ball-and-race type of bearing assembly which may be mounted in a housing cylindrical bore with extremely close alignment tolerances and in a manner so as to prevent loosening and subsequent movement of the bearing assembly with respect to the housing.

Another object of the present invention is to provide and disclose a novel self-aligning bearing and method of making and mounting a self-aligning bearing assembly which may be removably mounted in the housing, and which can be removed without the use of special tools and without destroying, injuring or damaging either the bearing or the housing.

A still further object of the present invention is to provide a method of making and forming a self-aligning bearing in an economical manner involving a minimum of manufacturing operations and relatively few components.

One more object of the present invention is to provide a ball-and-race type of bearing assembly and a method of making and mounting a ball-and-race type of bearing assembly which may be removed from a housing in which it is mounted when the bearing has become worn or damaged with the use of a simple wrench and a minimum of mechanical skill.

Other objects and advantages of this invention will become apparent from the following description considered in connection with the accompanying drawing.

In the drawings:

FIG. 1 is an exploded perspective view of an exemplary self-aligning bearing and a housing bore in which it is mounted;

FIG. 2 is a sectional view of a mounted exemplary self-aligning bearing constructed in accordance with the present invention;

FIG. 3 is a detailed fragmentary sectional view of a portion of the self-aligning bearing preparatory to securing in the housing bore;

FIG. 4 is a detailed fragmentary sectional view as in FIG. 3 showing the self-aligning bearing secured within the housing bore;

FIG. 5 is an exploded perspective view of a modified exemplary self-aligning bearing;

FIG. 6 is a detailed fragmentary sectional view of a portion of the self-aligning bearing of FIG. 5 as secured within the housing bore;

FIG. 7 is an exploded perspective view of a second modified exemplary self-aligning bearing; and FIG. 8 is a detailed fragmentary sectional view of a portion of the self-aligning bearing of FIG. 7 as secured within the housing bore.

Referring now to the drawings, a first exemplary embodiment of a high load, low friction greaseless spherical bearing, for mounting in a housing cylindrical bore, and constructed in accordance with the present invention, is shown in FIGS. 1 through 4. The bearing 9 is comprised of a rotatable ball member 10, including a bore 11 provided through the ball to facilitate the use of the bearing assembly with a shaft or rod which may be positioned therein. The bearing also comprises a bearing outer race member indicated generally at 12 having a generally cylindrical outer surface. In the first exemplary embodiment 9, as seen best in FIG. 2, a thin sheet or liner of low friction material 13 may be positioned between the ball 10 and the race 12 and against which ball 10 bears, although such linear 13 is not necessary to the practice of the present invention and may be eliminated.

Ball member 10 is preferably made of hardened metal and race 12 is preferably made of a blank of generally tubular shape usually of an unhardened malleable metal of lower hardness than the ball, such as stainless steel, so that it may be formed about the ball member 10 by the application of pressure thereon through the use of suitable forming dies. The forming of the bearing outer race member 12 on the generally spherical inner ball member 10 of the present invention may be performed by various methods, one of which is disclosed in detail in U.S. Pat. No. 3,063,133.

Briefly, the method of forming the ball and race of Pat. No. 3,063,133 may employ the use of an expansion pin which is force fitted into the bore 11 of the ball member 10 causing an initial expansion of the ball 10 within its elastic limit. Such expansion of the ball member is maintained during a subsequent swaging operation in which the race member 12 is formed about the ball member 10. Ultimately, when the pin is removed the ball 10 regains its original diameter for the necessary bearing clearance. In this method, the race 12 is initially in the form of a tubular blank with an inner diameter slightly greater than the diameter of the ball member 10, and the inner surface of the blank is rough machined or sand blasted to provide a surface suitable for receiving and retaining the low friction material 13. This low friction material 13, in the form of a woven fabric material having an adhesive backing of thermosetting material, is placed within the blank so as to cover the inner surface thereof before positioning the ball member within the blank. The thickness of the low friction material is generally about 0.020 or 0.030 inch and may be made with a cotton base, a surface weave of low friction material yarn and a back coating of adhesive which is thermosetting, such as a phenolic thermosetting resin. After the ball member is positioned within the race blank in which the low friction material 13 has been positioned, the race is then press formed or swaged about the ball 10 by the application of inwardly directed pressure thereon by a forming press employing suitable forming dies. After the forming pressure is relieved, the assembly is removed from the press and is subjected to a baking process in the absence of pressure. This causes the thermosetting adhesive backing on the fabric 13 to become bonded to the roughened inner surface of the race blank 12. The expansion pin is then removed which allows the ball to contract enough to provide a bearing in which the ball can be rotated within the race by the application of finger pressure and the bearing race is machined to form a generally cylindrical outer surface 15. The race 12 may also be swaged or formed about ball 10 in known manner without the use of an expansion pin and/or without a low friction material liner 13, the foregoing description being exemplary only of one method of forming the race 12 about ball 10 of the present invention.

After the above-described operation in forming the bearing race around the inner ball, and as particularly contemplated within the present invention, a radially outwardly extending flange 16 is then swaged or otherwise integrally formed at one end of the race 12 to abut an outer end 32 of housing opening or bore 31 when the assembled race and ball are inserted into the opening or bore 31. The other end of race 12 is machined to cut away material so as to provide a reduced diameter portion 17. Reduced diameter portion 17 is then externally threaded as at 18 to form a part of a locking means for holding the assembled race and ball to the housing. Such locking means, in the first exemplary embodiment, also includes the provision of a locking ring or nut 19. Locking nut 19 is formed with complementary internal threads 20 for engagement with the threads 18 of race 12. Locking nut 19 is also formed with a radially outwardly extending flange 21, having an inclined face as does flange 16 on race 12, for abutting an end of cylindrical bore 31 opposite to the end engaged by flange 16 to lock the race and ball subassembly into a rod end or housing as subsequently described.

The self-aligning bearing and the method of forming and mounting such bearing in a housing opening of the present invention may also include the provision of wrench engaging means. Such means, in the exemplary embodiment, comprises a plurality of radial slots 25 in flange 16 of race 12 and a plurality of radial slots 26 in the flange 21 of locking unit 19. The radial slots 25, 26 are formed in the outer circumferential edge portion of each of the flanges 16, 21 on the race 12 and locking nut 19.

The device and method of the present invention may also comprise a locking pellet 28 which is received in an opening 29 in the externally threaded reduced diameter portion 17 of race 12. Such locking element or pellet extends radially outwardly of the root of the threads 18 in the race 12 and are deformed by the threads 20 on locking nut 19 when the locking nut is secured to the race. Such locking pellet may be of the type described in Mil–F–18240B (ASG).

The self-aligning bearing 9 of the first exemplary embodiment is mounted in a housing such as housing 30 provided with a generally cylindrical bore 31 having chamfered edges 32 at its opposite outer ends. The diameter of opening or bore 31 in housing 30 is preferably only 0.002 to 0.003 inch greater than the diameter of outer surface 15 of race 12. The inner inclined surfaces of flanges 16 and 21 of race 12 and nut 19, respectively, bear upon the chamfered surfaces 32 of bore 31 in housing 30 when the bearing is mounted in the housing.

After the bearing is mounted in the housing, there is little or no free play between the bearing outer race and the housing and the bearing is securely and tightly mounted within the housing. Inadvertent loosening of the locking nut 19 from bearing race 12 is prevented through use of the locking pellet 28 which is deformed when the locking nut is threaded onto the bearing race. When the bearing is worn or has become damaged, it is easily removable from the housing without damage to the bearing or to the housing by use of standard and ordinary tools.

In the second exemplary embodiment of FIGS. 5 and 6, there is shown a spherical or self-aligning bearing 39 for mounting in a cylindrical bore as in the previous embodiment. Bearing 39 comprises a rotatable ball member 40 having a bore 41 therethrough to facilitate the use of the bearing assembly with a shaft to be positioned therein. Bearing 39 also comprises an outer race member 42. As in the first exemplary embodiment, bearing 39 may include a liner of low friction material 43 positioned between the ball 40 and the race 42 and against which the ball 40 will bear. The outer race member 42 includes a radially outwardly extending flange 46 integrally formed on one end of the race so as to abut the outer end of the housing cylindrical bore when the assembled race and ball are inserted into the bore. The other end of race 42 is machined to cut away material so as to provide a reduced diameter portion 47. The diameter portion 47 is externally threaded as at 48 on two diametrically opposed circumferential segments, which may be a 90° arcuate sector, forming a portion of breech locking means for holding the assembled race and ball to the housing. Such breech locking means also includes the provision of a locking ring or nut 49 formed with complementary internal threads 50 also formed in only two circumferential sectors of the inner cylindrical wall which are complementary with the sectors 48 allowing the nut 49 to be slid onto the reduced diameter portion 47 of the outer race 42 and then tightened with only a quarter turn. Locking nut 49 is also formed with a radially outwardly extending flange 51, having an inclined face as does flange 46 on race 42, for abutting the housing 60 at the end of the cylindrical bore 61 where there is provided a chamfer surface or edge 62.

Wrench engaging means which may comprise a plurality of radial slots 55 such as in the first exemplary embodiment, may be provided in the race 42 and locking nut 49 for securing the two portions together. As seen best in FIG. 6, the self-aligning bearing 39 is mounted in a housing 60 provided with a generally cylindrical bore 61 having chamfered edges at its opposite outer ends. The inner inclined surfaces of flanges 46 and 51 of race 42 and nut 49, respectively, bear upon the chamfered surfaces 62 of bore 61 in housing 60 when the bearing is mounted in the housing. If desired, a locking pellet may be provided as in the first exemplary embodiment.

The second exemplary embodiment illustrated in FIGS. 5 and 6 will be seen to be similar to the bearing of the first exemplary embodiment other than the provision of breech locking means in bearing 39 as opposed to the threaded locking means in bearing 9. Consequently, bearing 39 may be assembled into a housing with greater facility and considerable ease.

A third exemplary embodiment is illustrated in FIGS. 7 and 8, where there is shown a bearing 69 comprising a ball member 70 having a through-bore 71 enabling the bearing to be used with a shaft or rod to be positioned in the bore. The bearing also comprises an outer race member indicated generally at 72 having a generally cylindrical outer surface and, as in the previous embodiment, a thin sheet of low friction material 73 may be provided between the ball and race.

The locking means of bearing 69 includes the provision of a reduced diameter portion 77 on race 72 opposite from the end of the race on which is integrally formed a flange 76. The reduced diameter portion 77 of the outer race 72 is provided with spiral projections 78 which form a part of what is commonly known as cam-locking means for holding the assembled race and ball to the housing. Such cam-locking means also includes the provision of a locking nut 79 formed with complementary spiral projections 80 for engagement with the projections 78 of race 72. Locking nut 79 is also formed with a radially outwardly extending flange 81 for abutting housing 90 at the ends of cylindrical bore 91 which are provided with chamfered edges 92.

It will therefore be seen that the third embodiment 69 of a self-aligning bearing constructed in accordance with the present invention is adapted for simple and quick assembly in the cylindrical bore of a housing. As in the other constructions, there is little or no free play between the bearing outer race and the housing and the bearing assembly is securely and tightly mounted within the housing. However, unlike prior art constructions, when the bearing is worn or has become damaged, it is easily removable from the housing without destruction of the bearing or the housing and through the use of standard and ordinary tools.

While forming of the bearing outer race around the spherical inner ball has been described above with respect to a greaseless spherical bearing having a liner of low friction material, it will be understood that other types of spherical bearings, formed by other processes and methods, can be used in the present invention. It is therefore to be understood that within the scope of the appended claims, the invention may be practiced otherwise than as specifically described.

We claim:

1. A method of forming and mounting a bearing in a housing bore comprising:

forming a bearing outer race member around an inner member;
forming a radially outwardly extending flange with a diameter greater than the diameter of the housing bore at one end of said race member;
cutting away material from the other end of said race member to provide a reduced diameter;
externally threading said reduced diameter end of said race member;
forming a locking nut having complementary internal threads and a radially outwardly extending flange with a diameter greater than the diameter of the housing bore;
positioning said outer race member formed about said inner ball member within the housing bore so that said race flange bears against said housing; and
threadedly engaging said locking nut on said externally threaded reduced diameter end of said race member so that said locking nut flange bears against said housing so as to secure the self-aligning bearing within the housing bore.

2. The method of claim 1 wherein said bearing is self-aligning, said outer race member has a generally cylindrical outer surface, and said inner member is a generally spherical ball.

3. The method of claim 1 additionally comprising cutting a plurality of radial slots in the outer circumferential edge portion of each of said flanges so as to provide wrench engaging means.

4. The method of claim 3 additionally comprising inserting a locking pellet in said externally threaded reduced diameter end of said race member, extending radially above the root of said threads, so as to be deformed by said locking nut and to prevent said locking nut against loosening.

5. A mounted self-aligning bearing assembly comprising:

a housing having a cylindrical bore;
a generally spherical inner ball member having an axial bore;
a bearing outer race member having a generally cylindrical outer surface and formed around said generally spherical inner ball member;
said outer race member having a radially outwardly extending flange on one end thereof, and a reduced diameter portion on the other end thereof, said reduced diameter portion having external threads; and
a locking nut having complementary internal threads engaging said reduced diameter externally threaded end portion of said outer race member, including a radially outwardly extending flange,
said flanges on said race member and said locking nut having an outer diameter greater than the diameter of said housing cylindrical bore, whereby said bearing assembly may be removably and securely mounted in said housing.

6. The mounted self-aligning bearing assembly of claim 5 additionally including a locking pellet mounted in said reduced diameter portion of said outer race member and extending radially above the root of said threads so as to be deformed by said locking nut and thereby prevent said locking nut against loosening.

7. The mounted self-aligning bearing assembly of claim 6 additionally comprising wrench engaging means on each of said flanges so that said outer race member and said locking nut may be tightly threadedly engaged.

8. The mounted self-aligning bearing assembly of claim 5 wherein said housing bore is provided with chamfered edges and said flanges have an inclined surface for mating engagement with said chamfered edges.

9. An easily mounted bearing assembly for mounting into a generally cylindrical bore of a bearing housing, said bearing assembly comprising:

an outer race member formed about and thereby assembled to an inner rotatable bearing member;

flange means formed integrally of said outer race member for abutting against said housing at an outer end of said bore, said race member being otherwise adapted to fit into said housing bore; and locking means for holding said race member and assembled inner member within said housing bore with said flange means abutting said housing outer end and said inner member being rotatable relative to said outer race and housing.

10. The bearing assembly of claim 9 wherein said locking means comprises:

an externally threaded reduced diameter portion of said outer race at an end thereof; and a locking nut having complementary internal threads for engaging said race reduced diameter portion and a flange for abutting against an end of said bore opposite to said outer end.

References Cited

UNITED STATES PATENTS

| 2,906,568 | 9/1959 | Gray | 308—72 |
| 3,063,133 | 11/1962 | Straub et al. | 29—149.5 |
| 3,225,420 | 12/1965 | Sullivan | 29—149.5 |
| 3,243,212 | 3/1966 | May | 287—87 |
| 3,314,127 | 4/1967 | Acuff et al. | 29—149.5 |
| 3,442,561 | 5/1969 | Biabaud | 308—72 |

THOMAS H. EAGER, Primary Examiner

U.S. Cl. X.R.

29—441; 287—87; 308—72